United States Patent [19]

Overstreet

[11] Patent Number: 4,901,673
[45] Date of Patent: Feb. 20, 1990

[54] INSECT INHIBITING HUMMINGBIRD FEEDER

[76] Inventor: Richard S. Overstreet, 503 Grove St., Wilson, N.C. 27893

[21] Appl. No.: 320,582

[22] Filed: Mar. 8, 1989

[51] Int. Cl.⁴ .......................................... A01K 39/026
[52] U.S. Cl. ......................................... 119/77; 119/72
[58] Field of Search .............. 119/72, 77, 52 R, 51 R, 119/52 B, 57

[56] References Cited

U.S. PATENT DOCUMENTS

| | | | |
|---|---|---|---|
| 1,922,612 | 8/1933 | Barker | 119/77 |
| 4,030,451 | 6/1977 | Miller | 119/51 R |
| 4,607,597 | 8/1986 | Sevigny | 119/51 R |
| 4,691,665 | 9/1987 | Hefner | 119/77 |

FOREIGN PATENT DOCUMENTS 266514 2/1968 Austria .................... 119/77

Primary Examiner—John Weiss
Attorney, Agent, or Firm—Jerry T. Kearns

[57] ABSTRACT

An insect inhibiting hummingbird feeder has an open top hollow reservoir for storing a supply of simulated nectar, a base in fluid communication with the reservoir, a plurality of apertures in the base for allowing hummingbirds to drink the simulated nectar, and a plurality of perches on the base adjacent the apertures. A removable cap on the open top portion of the reservoir has a curved outer top surface sloping downwardly and upwardly from a central portion thereof. A fastener for suspending the hummingbird feeder from a tree or other mounting surface is secured to the central portion of the cap. An upwardly opening frusto conical receptacle surrounds the central cap portion and is filled with an insect inhibiting fluid such as oil. In use, the oil provides an effective barrier which prevents insects, and especially ants, from travelling down the suspending fastener to the simulated nectar filled reservoir. In a second embodiment, a slidable rain cover dome is utilized to prevent rain from washing oil out of the receptacle, and a bottom fill plug is provided to refill the reservoir with simulated nectar.

4 Claims, 5 Drawing Sheets

INSECT INHIBITING HUMMINGBIRD FEEDER

BACKGROUND OF THE INVENTION

1. Field of the Invention

The present invention relates to hummingbird feeders, and more particularly pertains to an insect inhibiting hummingbird feeder which utilizes an oil filled barrier to prevent ants and other insects from contaminating the nectar filled reservoir of the feeder. Many individuals enjoy feeding and observing hummingbirds. Conventional feeders for hummingbirds utilize an open top reservoir which is provided with a removable cap. Simulated nectar formed from water sweetened with sugar or honey is stored in the reservoir and is sipped by hummingbirds inserting their long slender beaks into access apertures provided in a base in fluid communication with the reservoir. Perches are also provided on the base adjacent the access apertures for the birds to perch upon. These conventional feeders are suspended by wire, string or cord from a tree, building or other mounting surface. The simulated nectar in the feeder provides a strong attractant for ants and other crawling insects which travel down the suspending wire or cord to the feeder. These insects not only consume the nectar, but also contaminate the feeder and discourage usage by hummingbirds. In order to overcome this problem, the present invention provides an improved hummingbird feeder which utilizes a fluid barrier to inhibit ants and other crawling insects.

2. Description of the Prior Art

Various types of bird feeders are known in the prior art. A typical example of such a bird feeder is to be found in U.S. Pat. No. 3,136,296, which issued to P. Luin on June 9, 1964. This patent discloses a bird feeder which has a seed filled reservoir communicating with an open base. The feeder is suspended by a wire or cord secured to a top central portion of the reservoir. U.S. Pat. No. 3,977,363, which issued to J. Fisher on Aug. 31, 1976, discloses a squirrel proof bird feeder having a removable conical top of an inverted hip roof construction with the major portion of the upper region of the top having a steep pitch, with the lower eaves or border having a gentle pitch, which construction tends to dump a squirrel climbing upon the roof from a suspended chain. U.S. Pat. No. 4,102,308, which issued to P. Kilham on July 25, 1978, discloses a bird feeder having a transparent hemispherical hood to protect the feeder from the elements and unwanted species including large birds and squirrels. U.S. Pat. No. 4,242,984, which issued to E. Smith on Jan. 6, 1981, discloses a combination bird feed container which is convertible into a feeder. U.S. Design Pat. No. 273,429, which issued to P. Kilham on Apr. 10, 1984, discloses a bird feeder having an open pan shaped base in fluid communication with a cylindrical reservoir provided with an attachment loop.

While the above mentioned devices are suited for their intended usage, none of these devices disclose a hummingbird feeder provided with a removable cap with an insect inhibiting fluid filled receptacle to prevent contamination of the feeder reservoir by ants and other crawling insects. Additionally, none of these prior art devices disclose the use of an oil filled receptacle on a hummingbird feeder covered by a slidable dome to prevent rain water from flushing the oil out of the receptacle. Inasmuch as the art is relatively crowded with respect to these various types of hummingbird feeders, it can be appreciated that there is a continuing need for and interest in improvements to such hummingbird feeders, and in this respect, the present invention addresses this need and interest.

SUMMARY OF THE INVENTION

In view of the foregoing disadvantages inherent in the known types of hummingbird feeders now present in the prior art, the present invention provides an improved insect inhibiting hummingbird feeder. As such, the general purpose of the present invention, which will be described subsequently in greater detail, is to provide a new and improved insect inhibiting hummingbird feeder which has all the advantages of the prior art hummingbird feeders and none of the disadvantages.

To attain this, a representative embodiment of the concepts of the present invention is illustrated in the drawings and makes use of a hummingbird feeder with an open top hollow reservoir for storing a supply of simulated nectar, a base in fluid communication with the reservoir, a plurality of apertures in the base for allowing hummingbirds to drink the simulated nectar, and a plurality of perches on the base adjacent the apertures. A removable cap on the open top portion of the reservoir has a curved outer top surface sloping downwardly and upwardly from a central portion thereof. A fastener for suspending the hummingbird feeder from a tree or other mounting surface is secured to the central portion of the cap. An upwardly opening frusto conical receptacle surrounds the central cap portion and is filled with an insect inhibiting fluid such as oil. In use, the oil provides an effective barrier which prevents insects, and especially ants, from travelling down the suspending fastener to the simulated nectar filled reservoir. In a second embodiment, a slidable rain cover dome is utilized to prevent rain from washing oil out of the receptacle, and a bottom fill plug is provided to refill the reservoir with simulated nectar.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved insect inhibiting hummingbird feeder which has all the advantages of the prior art hummingbird feeders and none of the disadvantages.

It is another object of the present invention to provide a new and improved insect inhibiting hummingbird feeder which may be easily and efficiently manufactured and marketed.

It is a further object of the present invention to provide a new and improved insect inhibiting hummingbird feeder which is of a durable and reliable construction.

An even further object of the present invention is to provide a new and improved insect inhibiting hummingbird feeder which is susceptible of a low cost of manufacture with regard to both materials and labor, and which accordingly is then susceptible of low prices of sale to the consuming public, thereby making such hummingbird feeders economically available to the buying public.

Still yet another object of the present invention is to provide a new and improved insect inhibiting hummingbird feeder which provides in the apparatuses and methods of the prior art some of the advantages thereof, while simultaneously overcoming some of the disadvantages normally associated therewith.

Still another object of the present invention is to provide a new and improved insect inhibiting hummingbird feeder which utilizes a removable cap having an upwardly opening receptacle surrounding a suspending fastener and filled with an insect inhibiting fluid.

Yet another object of the present invention is to provide a new and improved insect inhibiting hummingbird feeder which decreases required maintenance.

Even still another object of the present invention is to provide a removable cap for conventional hummingbird feeders which may be easily retrofitted to inhibit access of ants and other crawling insects to the reservoir of the feeder.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention. cl BRIEF DESCRIPTION OF THE DRAWINGS The invention will be better understood and objects other than those set forth above will become apparent when consideration is given to the following detailed description thereof. Such description makes reference to the annexed drawings wherein:

DESCRIPTION OF THE PREFERRED EMBODIMENT

Figure 1:
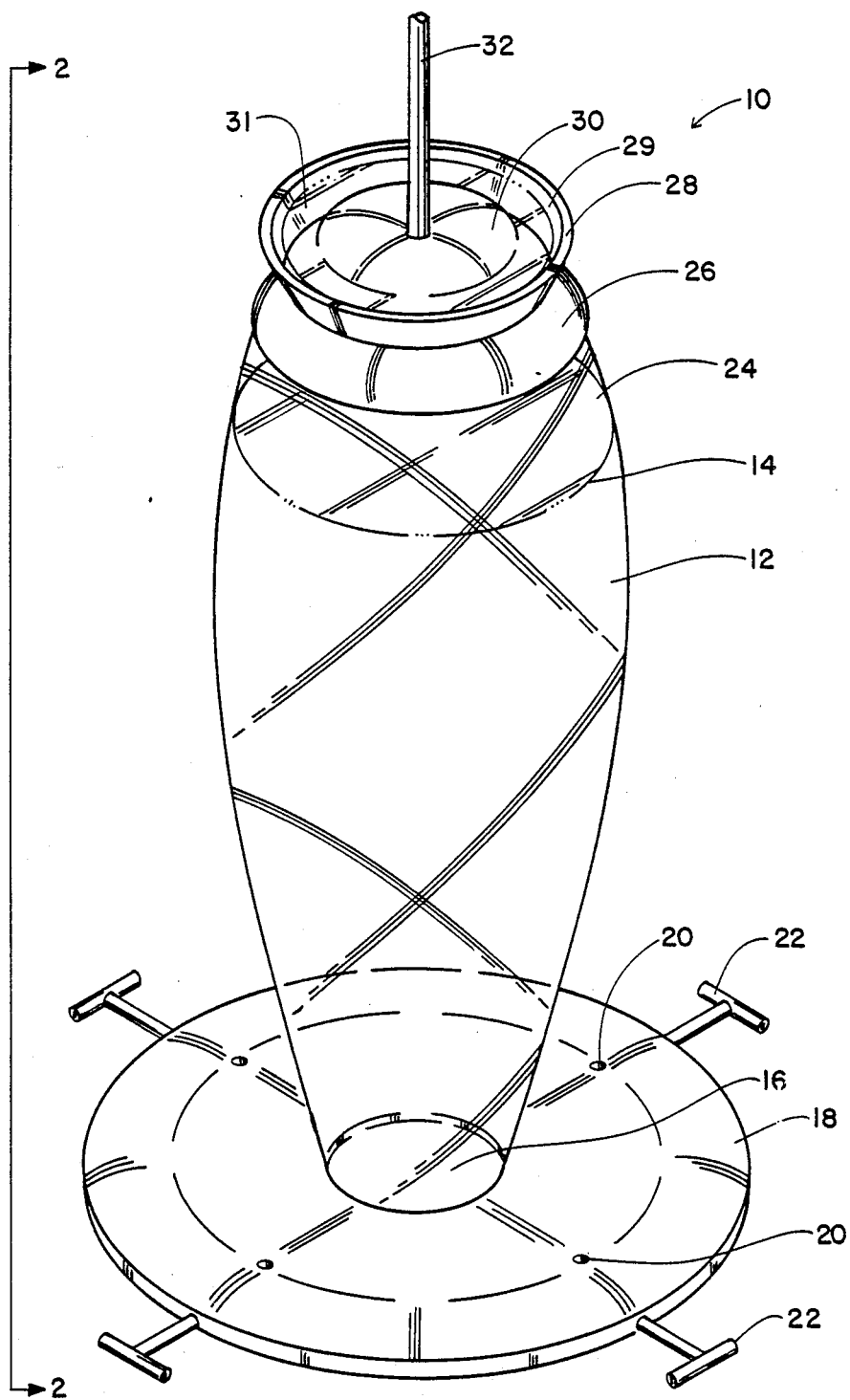
FIG. 1 is a perspective view of the insect inhibiting hummingbird feeder of the present invention.

With reference now to the drawings, and in particular to FIG. 1 thereof, a new and improved insect inhibiting hummingbird feeder embodying the principles and concepts of the present invention and generally designated by the reference numeral 10 will be described.

More specifically, it will be noted that the first embodiment 10 of the invention includes a hollow fluid reservoir 12 which is preferably formed from a transparent glass or plastic material. The reservoir 12 may be of the illustrated tapering configuration or may be cylindrical or any other desired shape, without departing from the scope of the present invention. The reservoir 12 is filled in a conventional fashion with a simulated nectar 14, customarily formed by mixing water with honey or sugar. An open bottom portion 16 of the reservoir 12 is in fluid communication with a hollow base 18 provided with a plurality of access apertures 20. A perch 22 is provided adjacent each of the access apertures 20. In use, hummingbirds land on the perches 22 and insert their long slender bills into the apertures 20 and drink the nectar 14. An open top portion 24 of the reservoir 12 is provided with a removable cap 26 which has an outer top surface 30 which slopes downwardly and outwardly from the central portion thereof. A suspending fastener 32 is centrally attached on the outer top surface 30 of the removable cap 26. The suspending fastener 32 may be in the form of a wire, a cord or a rigid or flexible rod. An upwardly opening frusto conical receptacle 28 surrounds the central portion of the cap 26 and the suspending fastener 32, forming a trough or moat 29, which is filled with an insect inhibiting fluid 31. The fluid 31 is preferably non-toxic mineral oil, but may also comprise some form of insecticide or agent or water treated with a wetting agent such as soap, to prevent ants and other crawling insects from obtaining passage from the suspended fastener 32 to the body of the reservoir 12.

Figure 2:
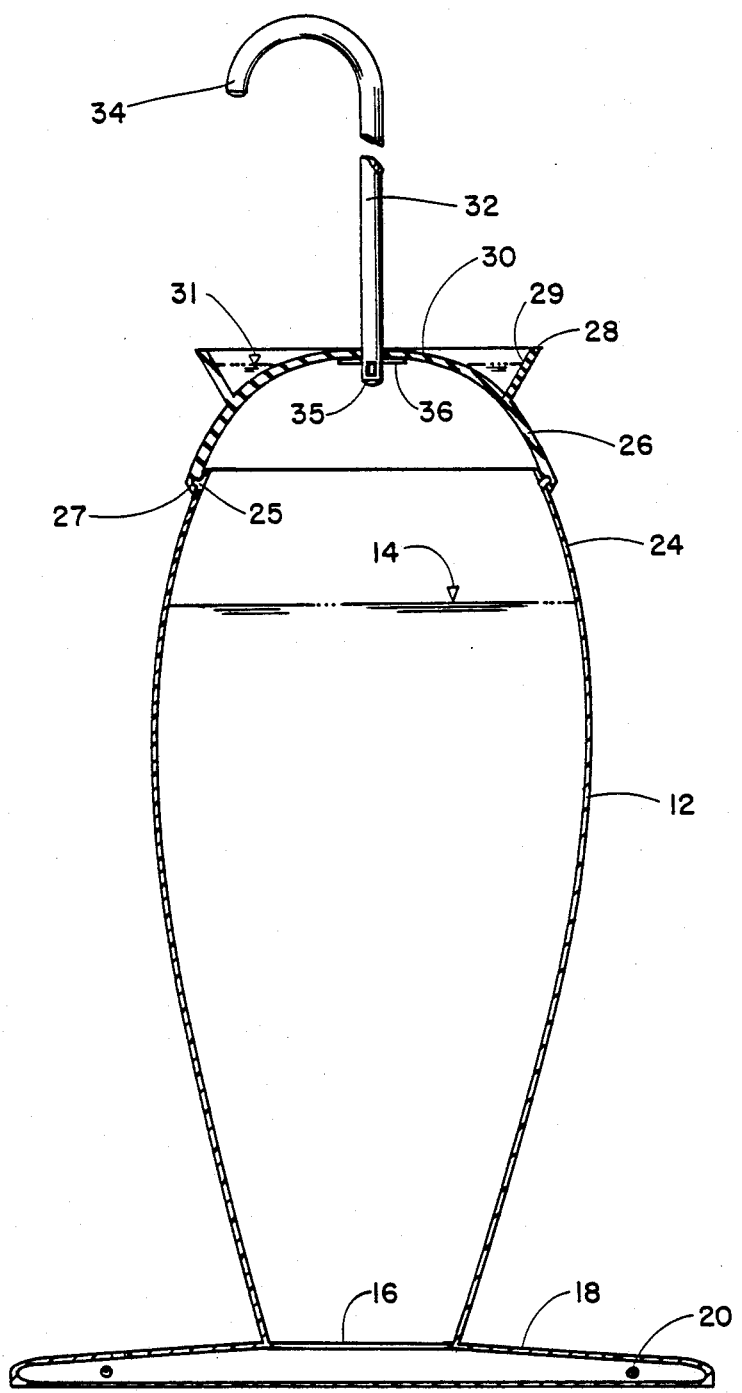
FIG. 2 is a longitudinal cross sectional view, taken along line 2—2 of FIG. 1.

As shown in FIG. 2, the suspending fastener 32 may be in the form of a rigid rod having a hooked end 34 for securement over a tree limb or other mounting surface. The fastener 32 may be secured in any known manner to the central top surface 30 of the cap 26, for example adhesively or may even be integrally molded therewith. In the illustrated embodiment, the fastening rod 32 is inserted through a central aperture in the cap 26 and a retaining clip 36 is engaged over an inner end 35 thereof. The cap 26 is preferably formed from a resilient rubber material and is provided with cooperating sealing means for effecting a fluid type seal with the upper portion 24 of the reservoir 12. The sealing structure may take the form of an annular groove 27 provided in the cap 26 and a cooperating annular projection 25 formed on the reservoir 12. Alternatively, for use with the widely used type of feeder having a cylindrical reservoir, the cap 26 may have a cylindrical body portion correspondingly dimensioned for frictional sealing engagement with the reservoir. Thus, by appropriate dimensioning of the cap 26, it may be easily retrofitted on a wide variety of existing hummingbird feeders.

In use, ants and other crawling insects travelling down the suspending fastener 32 reach the central top surface 30 of the cap 26 and are prevented from further approach by the oil 31 in the receptacle 28. The oil 31 both discourages ants from further approach and kills any ants which do enter, thus providing an ant free hummingbird feeder. In tests, conventional hummingbird feeders were found to require cleaning every two days in order to remove accumulated ants. The hummingbird feeder of the present invention, in contrast, was employed without maintenance until the entire contents of the reservoir 12 was consumed by feeding birds. Additionally, the conventional hummingbird feeder quickly became so contaminated with ants that hummingbirds did not approach after the two day period.

Figure 3:
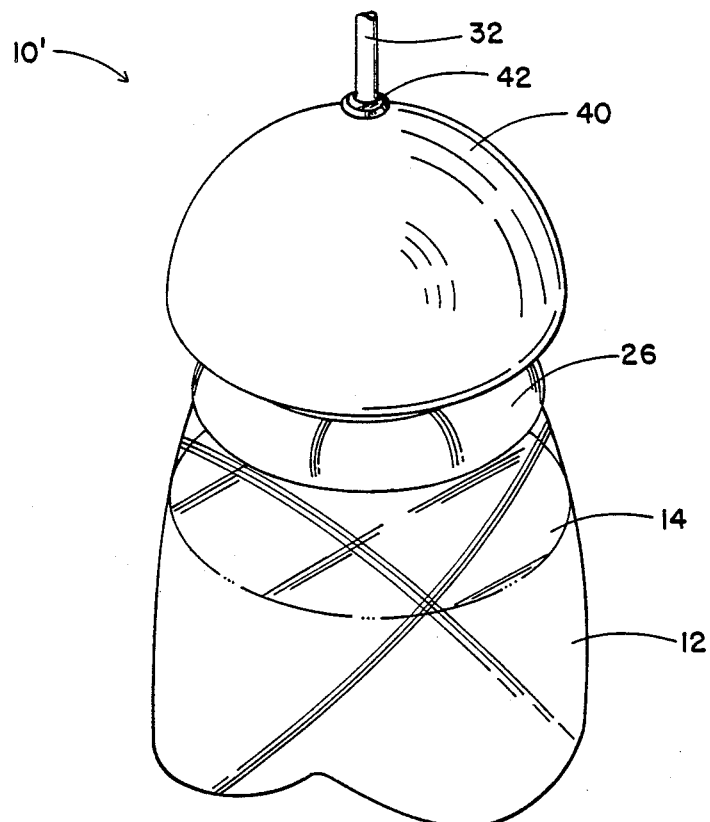
FIG. 3 is a partial perspective view illustrating a hummingbird feeder according to a second embodiment of the invention, which includes a slidable rain cover dome.

FIG. 3 illustrates a second embodiment 10' of a hummingbird feeder according to the present invention, which includes a domed rain cover 40, formed as a hemispherical shell, which is slidably received on the rod 32. A tight fitting nylon washer 42 retains the cover 40 in an axially adjusted position.

Figure 4:
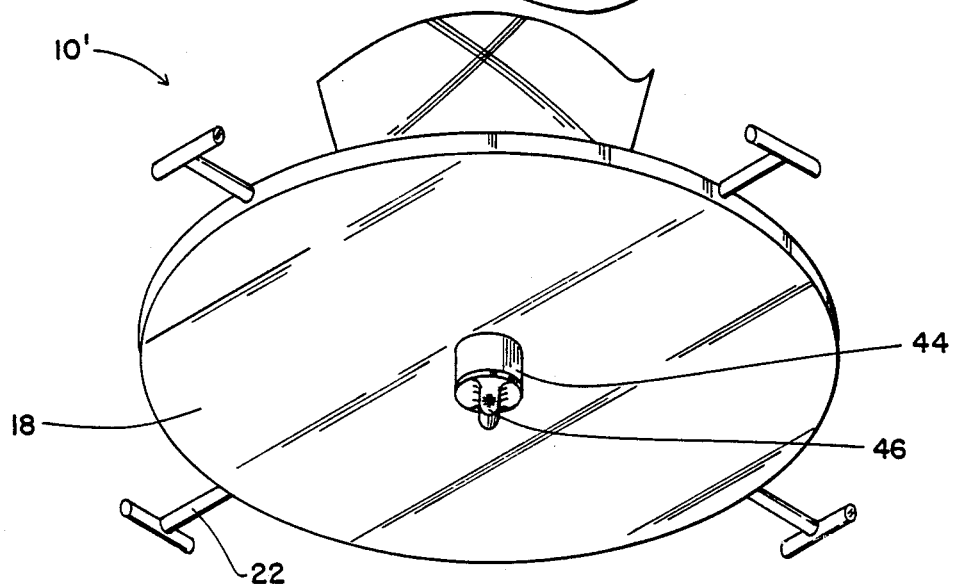
FIG. 4 is a partial perspective view of the hummingbird feeder of FIG. 3, illustrating the bottom nectar reservoir fill plug.

As shown in FIG. 4, a fill neck 44 is provided centrally in the bottom surface of the base 18. The fill neck is capped by a threaded plug 46.

Figure 5:
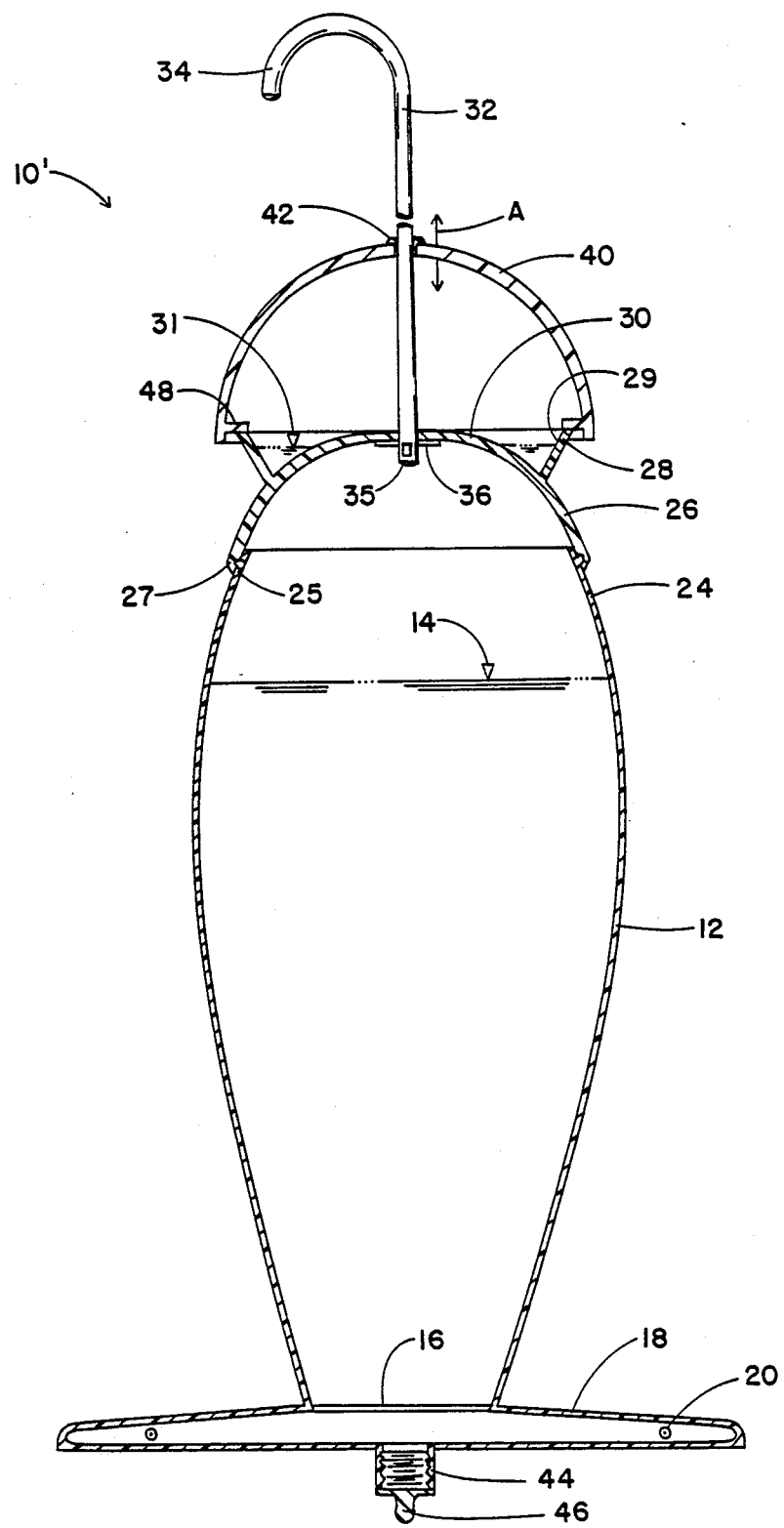
FIG. 5 is a longitudinal cross sectional view illustrating the hummingbird feeder of FIG. 3.

FIG. 5 depicts a longitudinal cross sectional view which illustrates the dome cover 40 mounted for sliding movement along the rod 32 as indicated by arrow A. The cover 40 may be moved to the illustrated lowered position to prevent spillage of the oil 31 from the receptacle during transportation to the feeding site. In use, the cover 40 is raised slightly, so as to shield the receptacle 28 from rain water, which would flush out the oil 31 and allow a path for crawling insects. The dome cover 40 may include circularly arrayed rests 48, which limit downward movement of the dome 40, past the illustrated transportation position. To fill the reservoir 12, it is inverted and the dome cover 40 is moved toward the hook 34. This causes the oil 31 to run out of the receptacle 28, which forces the individual to replace and thus ensure the effectiveness of the mineral oil 31. The reservoir 12 is then filled through the neck 44 and the plug 46 is replaced.

Figure 6:
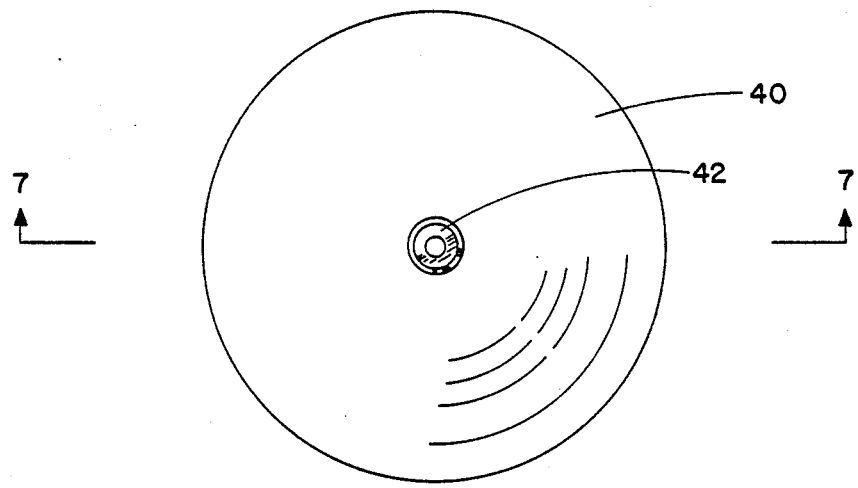
FIG. 6 is a top plan view of the rain cover dome of the hummingbird feeder of FIG. 3.
Figure 7:
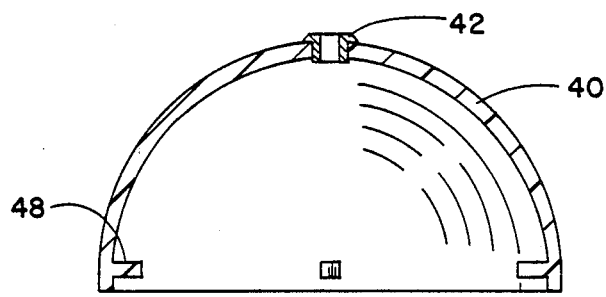
FIG. 7 is a transverse cross sectional view, taken along line 7—7 of FIG. 6.
Figure 8:
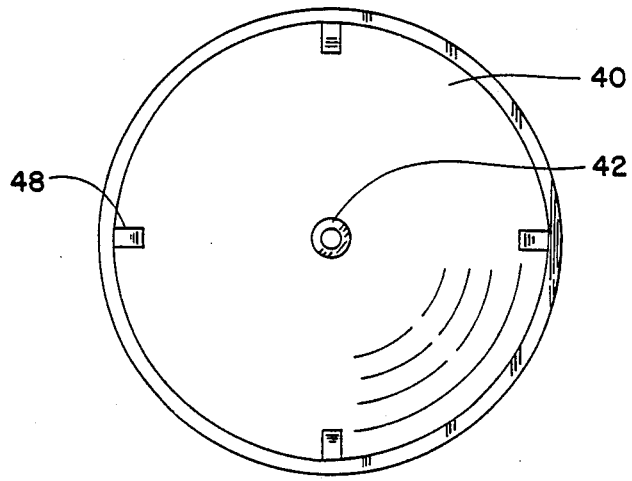
FIG. 8 is a bottom plan view of the rain cover dome.

FIGS. 6, 7 and 8 provide respectively, top plan, transverse cross sectional and bottom plan views which further illustrate the configuration of the dome cover 40.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In a hummingbird feeder having an open top hollow reservoir for storing a supply of simulated nectar, a base in fluid communication with the reservoir, a plurality of apertures in the base for allowing hummingbirds to drink the simulated nectar, and a plurality of perches on the base adjacent the apertures, the improvement comprising:

a removable cap on said open top portion of said reservoir;

cooperating frictional sealing means on said cap and said reservoir including an annular projection formed on one of said reservoir and said cap and a mating annular groove formed on the other of said reservoir and said cap;

said cap having an outer top curved surface sloping downwardly and outwardly from a central portion;

means for suspending said hummingbird feeder attached to said central cap portion;

an upwardly and outwardly tapering open frusto conical receptacle coaxially surrounding said central cap portion;

an insect inhibiting fluid in said receptacle;

a rain cover on said feeder for preventing rain water from washing said insect inhibiting fluid from said receptacle; said rain cover formed by a hemispherical dome slidably mounted on said suspending means;

and a plurality of radially inwardly extending rests disposed in a circular array within said dome, said rests dimensioned for abutment with a top wall of said frusto conical receptacle to limit downward movement of said cover.

2. The insect inhibiting hummingbird feeder of claim 1, wherein said insect inhibiting fluid comprises oil.

3. The insect inhibiting hummingbird feeder of claim 1, wherein said cap is formed from a resilient rubber material.

4. The insect inhibiting hummingbird feeder of claim 1, further comprising a fill opening for said reservoir formed in a bottom surface of said base and sealed by a removable plug.

* * * * *